Aug. 20, 1968  G. H. FATHAUER  3,397,715

ELECTRONIC LEVEL CONTROL

Filed May 6, 1965  3 Sheets-Sheet 1

INVENTOR.
George H. Fathauer

BY Hill, Sherman, Meroni, Gross & Simpson
ATTORNEYS

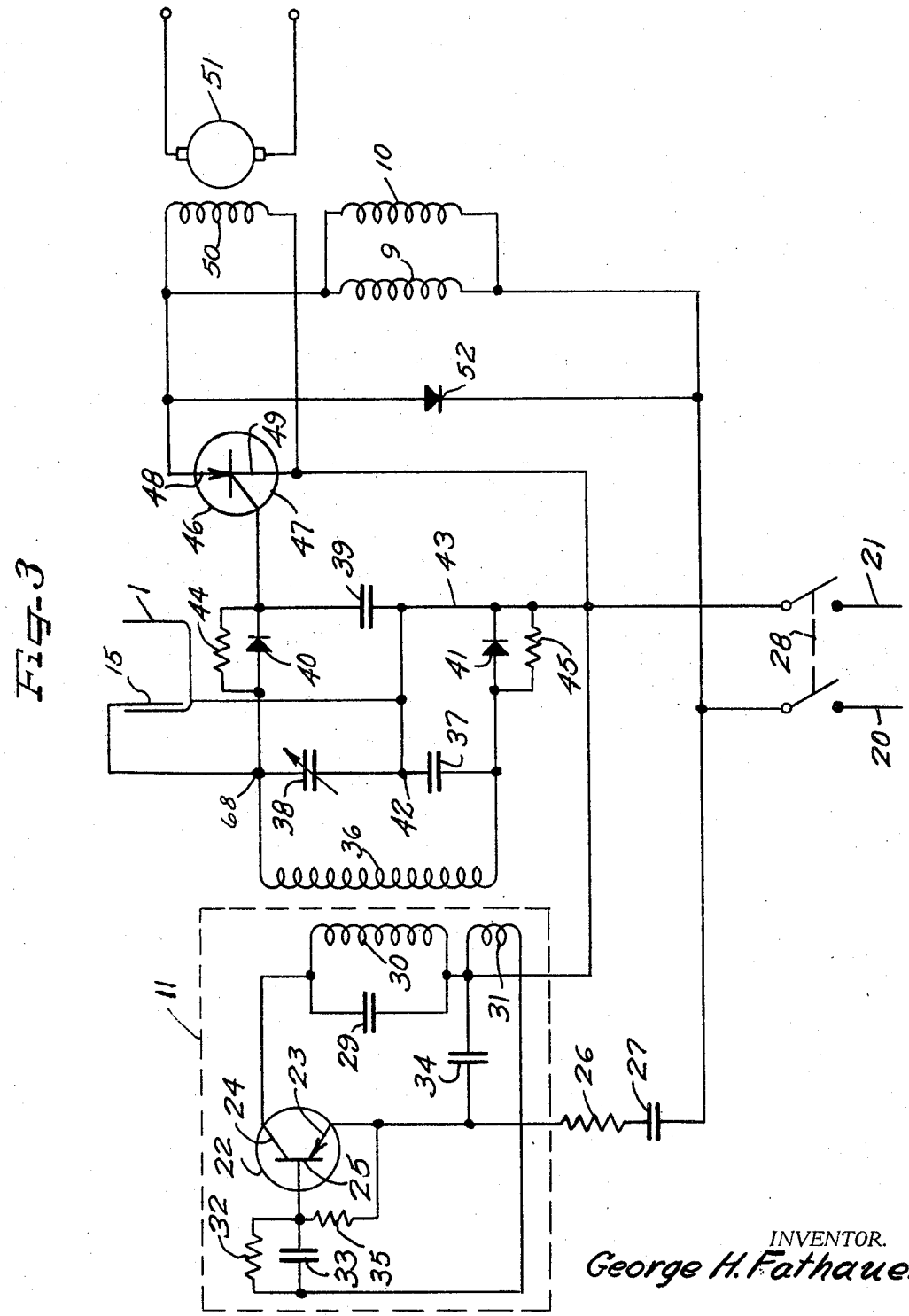

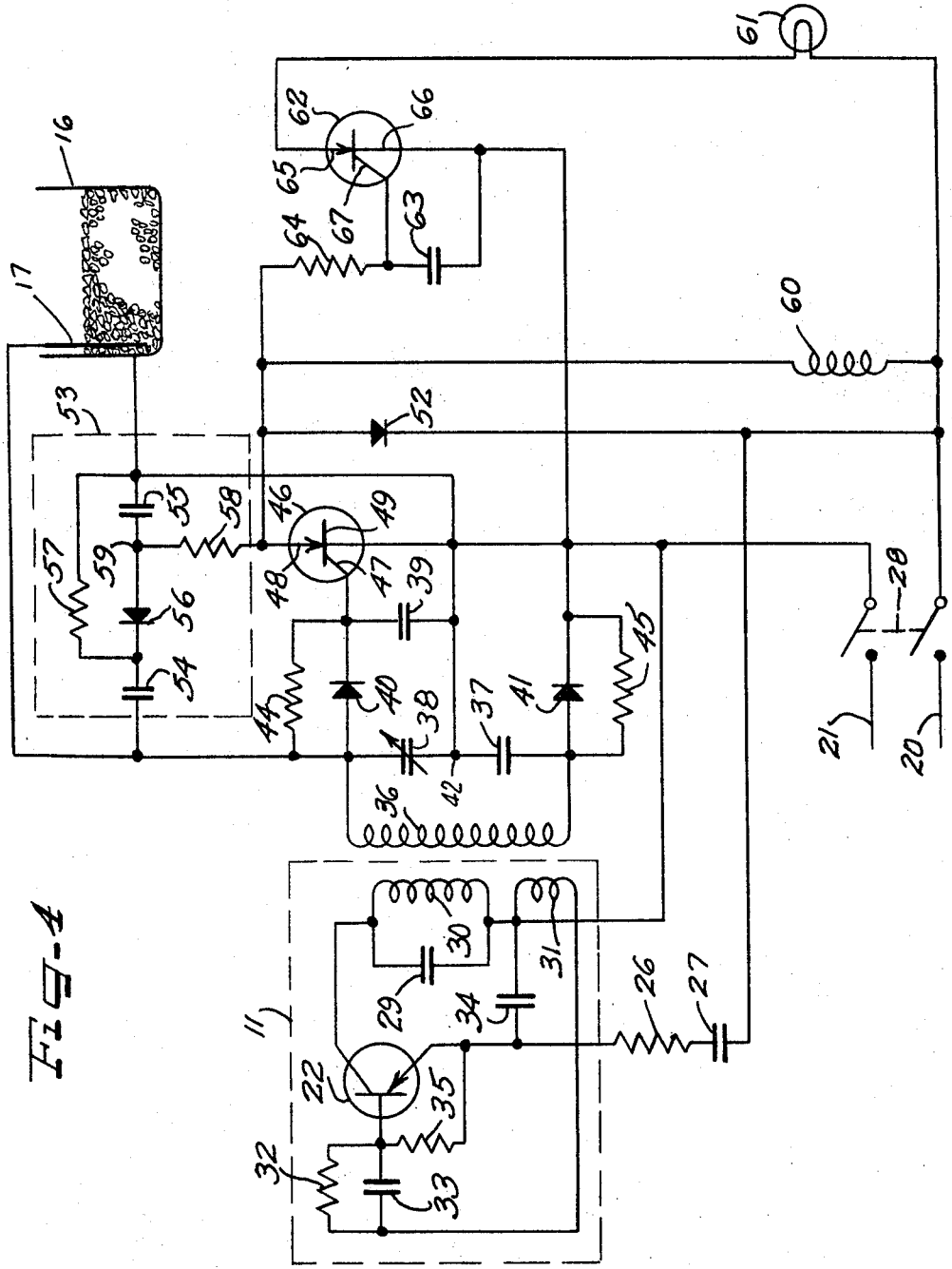

United States Patent Office 3,397,715
Patented Aug. 20, 1968

3,397,715
ELECTRONIC LEVEL CONTROL
George H. Fathauer, Decatur, Ill., assignor to Radson Engineering Corporation, Macon, Ill., a corporation of Illinois
Filed May 6, 1965, Ser. No. 453,625
10 Claims. (Cl. 137—387)

ABSTRACT OF THE DISCLOSURE

An electronic level control device for regulating the level of fluid or solids within a container such as within a washing machine or ice cube dispenser. The device includes a high frequency oscillator circuit for increasing the sensitivity of a capacitance control circuit which is utilized to signal the achieving of a desired fluid or solid level of the material being sensed. The oscillator is coupled through a high impedance transformer to the capacitance control circuit. The capacitance control circuit includes a variable capacitor coupled in parallel with a capacitance which is formed between a probe disposed adjacent to a conducting wall of a container, and the AC voltage developed thereby is rectified and applied to the gate of a silicon controlled rectifier which controls the filling of the container which holds the probe.

---

This invention relates to an electronic level control, and particularly to an electronic control circuit for regulating the level of a liquid within a container such as water within a laundry machine, or the level of a pile of pieces of solid matter such as ice cubes within a reservoir of an ice making device.

Automatic laundry machines in the past have required the delivery of a predetermined quantity of liquid to a tub at one or more stages of the complete cycle of operation. The amount of liquid delivered to the tub has been determined either through the use of a float switch which effects shut off of the liquid supply or by delivering the liquid for a predetermined period of time and then shutting off the supply through a timer. These prior art arrangements have had one significant disadvantage and that is the fact that the total volume delivered could not be readily changed to a different pre-selected setting to control the total volume of liquid delivered. A float switch could, of course, have the location of the float switch altered by shifting it mechanically or the time delivery arrangement could be altered by changing the mechanism such as the cams of the timer.

It is recognized, however, that there are many variable conditions which, in order to obtain efficient operation of the laundry machine, require ready and convenient methods of changing the total quantity of liquid delivered.

With respect to the control of the total quantity of pieces of solid matter to a reservoir such, for example, as ice cubes to the storage bin of an automatic ice making machine, it has also been recognized that it is desirable to be able to vary the height of the pile in a ready and convenient manner by pre-selections made by the operator. Means for automatically controlling the operation of an ice making machine has been provided in the past by having a mechanical feeler which shuts off the device when the pile of ice cubes reaches a height determined by the physical position of the feeler. The mounting assembly of the feeler can, of course, be mechanically arranged in such a manner that its physical position can be adjusted by the operator but this has not been found to be an economical way to handle the problem nor a convenient way from the standpoint of the user.

It is an object of the present invention to provide a novel electronic level control which will operate to control the total volume of liquid delivered to a container or the total volume of pieces of solid material delivered to a reservoir and which volume may be readily and conveniently varied by the operator of the device with which it is associated.

It is a further object of the present invention to provide an electronic level control which determines level by very small variations in capacity of a portion of the circuit brought about by the presence or absence of liquid or material whose height is being determined.

Another object of the present invention is to provide a novel electronic liquid or material level control which includes the use of a capacitance bridge, the capacity of one arm of the bridge being varied by an electric probe disposed in spaced relation from a wall of the container into which the liquid or material is being supplied.

It is a still further object of this invention to provide means for controlling the level of liquid or material along a continuous spectrum of levels within a container.

These and other objects, features and advantages of the present invention will be more fully realized and understood from the following detailed description when taken in conjunction with the accompanying drawings wherein like reference numerals are intended to designate the same or similar structures and wherein.

FIGURE 3 is a schematic diagram of an electronic level control embodying the novel features and principles of the present invention and being associated with an automatic washing machine; and FIGURE 4 is a schematic diagram of an electronic level control embodying the novel teachings and principles of the present invention as particularly applicable to controlling the level of ice cubes in the reservoir of an automatic ice making machine.

Figure 1:
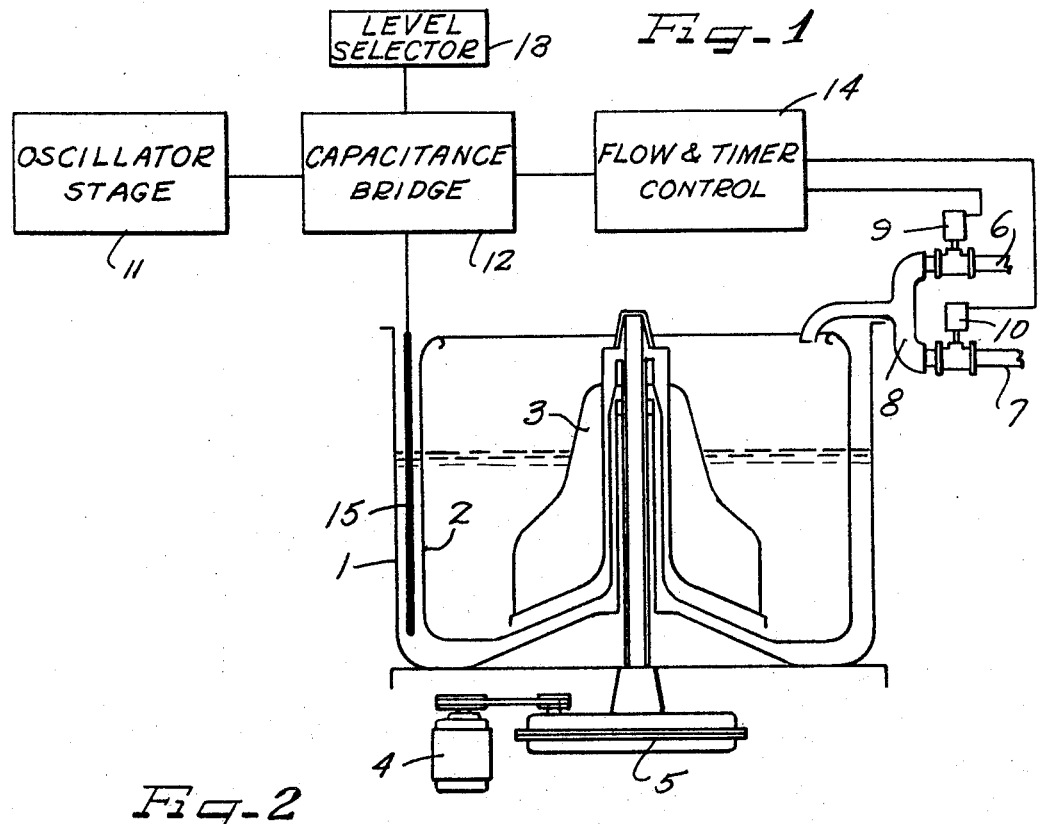
FIGURE 1 is a diagrammatic view of a washing machine and a block diagram showing a preferred embodiment of the present invention.

In the embodiment of the present invention illustrated in FIGURE 1, an automatic washing machine is depicted having a water containing tub 1, a clothes containing basket 2 mounted for rotation about a vertical axis and an agitator 3 mounted centrally within the basket for oscillation about a vertical axis. An electric motor 4 is arranged to drive selectively the basket 2 or the agitator 3 through a transmission 5. Water is delivered to the tub 1 from hot and cold water supply pipes 6 and 7 through a mixing and shut-off valve 8, the latter being actuated electrically through solenoid means 9 and 10. The associated block diagram indicates that an electronic level control is provided which includes an oscillator 11, a capacitance bridge 12, a level selector 13 which can adjust the point at which the bridge performs a control function, and a flow and timer control 14. The bridge 12 includes a probe 15 in the form of a sheet or rod of conductive material which is disposed vertically between the substantially vertical wall of the tub 1 and the substantially vertical wall of the basket 2.

Figure 2:
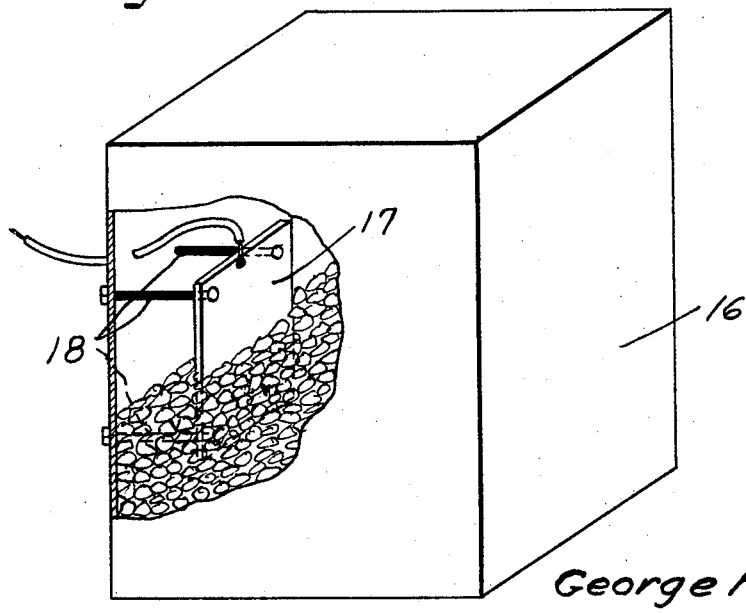
FIGURE 2 illustrates the reservoir of an automatic ice making machine having a cut-away portion displaying a pertinent feature of this invention.

In FIGURE 2, the storage reservoir or bin 16 of an automatic ice making machine is shown. A conductive sheet 17 is mounted in spaced relation to a vertical wall of the reservoir 16 by non-conductive mounting means 18.

In both arrangements above referred to a probe (15 or 17) is used in conjunction with the container (1 or 16) to provide a capacitance to be inserted into a portion of a capacitance bridge. Since the overall effective dielectric constant of the region between the probe and the associated tub or reservoir wall varies as a function of the volume filled by water or ice, it is apparent that the height of water or ice covering the probe is a function of the capacity between the probe and wall of the tub or reservoir. This variation in capacity is utilized to perform a control function. This capacity measurement process is enhanced by the use of a high frequency voltage supply obtained from an oscillator stage. The oscillator stage is itself energized by a standard 115 volt A.C. line.

A preferred embodiment of an electronic level control for an automatic washing machine is shown in detail in FIGURE 3. Since domestic laundry machines are usually energized from a conventional 115 volt A.C. public utility supply, the level control is arranged to be energized from such a source through power supply conductors 20 and 21. Since small differences of capacity can be more easily measured when capacitors are involved in a relatively high frequency network, an oscillator is here provided for developing oscillations having a frequency, for example, of approximately 500 kilocycles per second. One convenient form of oscillator is a common-emitter oriented feedback oscillator with a transformer providing the necessary phase reversal for positive feedback. As shown, a p-n-p transistor 22 is employed having an emitter 23, a collector 24 and a base 25. The emitter 23 is connected through a resistor 26 and a capacitor 27 to power supply conductor 20 through one side of a double pole, single throw switch 28. Resistor 26 may, by way of example, be around 3.3 K ohms and capacitor 27 around .22 microfarad.

A tank circuit comprising a capacitor 29 and parallel inductance element 30 is connected at one side to collector 24 and at the other side to power supply conductor 21 through switch 28. Phase reversal and feedback is obtained by inductively coupling an inductance element 31 to the base 25 of transistor 22 through a resistor 32 and a parallel connected capacitor 33. The emitter-base circuit and emitter-collector circuit are completed by connecting the upper end of inductance 31 and the lower end of inductance 30 together and by connecting this common point through a capacitor 34 to emitter 23. An emitter to base biasing resistor 35 is provided therebetween. This resistor 35 provides a voltage divider action with resistor 26 and capacitor 27 when the AC supply voltage is of reverse polarity. Under these conditions, the collector to base junction of transistor 22 is conducting. If this voltage divider is not employed as shown full line voltage would be applied across the emitter to base junction of transistor 22. Thus the use of resistor 35 in combination with resistor 26 and/or capacitor 27 enables the use of a low voltage transistor directly from a 115 volt AC power line.

The output of the oscillator 11 is fed to a network of capacitance for the purpose of developing a control voltage sufficient to actuate a control hereinafter to be described. This capacitance network may be conveniently referred to as a capacity bridge. In general, it provides for two capacitors disposed in parallel paths, which two parallel capacitors are connected in series with a third capacitor, the combined group being connected across the coil 36. More specifically, a variable capacitor 38 is connected in series with a capacitor 37 across the coil 36. Shunted across the variable capacitor 38 is the capacity which is formed by the probe 15 and the vertical wall of the tub 1. A DC storage capacitor 39 is connected in series with a diode 40 across variable capacitor 38 in the manner shown. Connected in parallel with the capacitor 37 is a second diode 41. The common point 42 lying between capacitors 38 and 37 is connected to conductor 43 which, in turn, is connected through the switch 28 to the power supply conductor 21. The common point 42 is also connected to the underside of capacitor 39 as shown. The diodes 40 and 41 are provided with shunt resistors 44 and 45 to provide a DC return path for the gate 47 of a silicon controlled rectifier 46. The action of these shunt resistors 44 and 45 is comparable to that of the load resistor used in conventional diode detector circuits. The upper side of capacitor 39 is connected not only to the diode 40 but also the gate 47 of the silicon controlled rectifier 46.

From a consideration of the circuit described above, it will be understood by those skilled in the art that during the positive half cycle, the capacitor 39 develops a DC voltage proportional to the AC voltage across capacitor 38 and the capacity provided by probe 15, while during the negative half cycle the capacitor 39 develops a DC voltage of reverse polarity in proportion to the AC voltage impressed across capacitor 37. That is, capacitor 37 works with diode 41 equally and opposite to the combination of capacitor 38 and probe 15 working with diode 40. Therefore, the charge developed on capacitor 37 during positive half cycles will, during negative half cycles, reduce the charge previously applied to capacitor 39 during positive half cycles from capacitor 38. The difference between these oppositely directed half cycle voltages then becomes the DC control voltage utilized for firing the silicon controlled rectifier. It can be understood, therefore, that the level of this control voltage is a function of the comparative values of the effective capacitance between the points 42 and 68, and the capacitance 37.

The effective capacitances between the points 42 and 68, however, can be varied either by changing the water level within the tube 1 or by altering the setting of capacitor 38. For example, should the water level fall, the probe capacity and, hence, the capacity between the points 42 and 68 would decrease resulting in an increase in charge stored on capacitor 39 which will fire the silicon controlled rectifier and initiate a re-filling of the tub. If, however, a low water level is desired, the associated low capacity provided by the probe 15 must be compensated by an increased setting of the capacitor 38 to keep the overall capacity between the points 42 and 68 from falling to the critical value for firing the silicon controlled rectifier. The setting of capacitor 38, thereafter, determines the level of water that will accomplish this critical value of capacitance between the points 42 and 68. In this way, the capacitor 38 provides a manually adjustable water level control for the tub and can be calibrated to be read directly for this purpose.

The utilization of this control voltage will now be apparent in the actual control operation.

At the beginning it is, of course, necessary to turn the water supply valves on by energizing solenoids 9 and 10. This is accomplished by closing the power switch 28 and thus supplying power to the solenoid actuated valves from the power supply conductor 28 through the solenoids 9 and 10 and back through the silicon controlled rectifier 46 to the power supply conductor 21, it being remembered that upon closing of the power switch 28, the oscillator 11 starts employing a high frequency signal across the capacitance bridge which, in turn, provides the bias to the gate 47 of the silicon controlled rectifier 46. Energization of the solenoids 9 and 10 causes water to begin pouring into the tub 1 and as the water rises the capacitance created by the probe 15 and the tub 1 increases which, in turn, gradually decreases the voltage on the capacitor 39 when the water in the tub has reached a height sufficient to cause the voltage on the gate 47 to be reduced to the critical level and the silicon controlled rectifier ceases to conduct. At this time the AC voltage from the power supply conductors 20 and 21 is applied across the solenoids 9 and 10 and the filed windings 50 of the timer motor 51, the path being from conductor 20 through switch 28 and then through solenoids 9 and 10 in parallel and then through winding 50 and back to power supply conductor 21. Since the voltage drop is now divided between the solenoids 9 and 10 and the field winding 50 and since the impedance of solenoids 9 and 10 is relatively low compared with that of winding 50, there is not sufficient voltage across the solenoids 9 and 10 to maintain them in a valve actuated position. Winding 50, however, is sufficient to drive the timer motor 51. A diode 52 is preferably connected in shunt across the solenoids 9 and 10 to act as a smoothing device. It has been found that a capacitor can be substituted in place of the diode 52 under most circumstances.

In considering the above circuit, it will be noted that the silicon controlled rectifier, when it is conducting, shorts out the motor winding 50 for half cycles only. The motor, however, requires full cycle operation in order to operate and the shorting of half cycles is then sufficient to prevent the motor 51 from running.

In order to get the maximum energy through the anode-cathode circuit of the silicon controlled rectifier 46 it is desirable that the firing point in the cycle in each conducting half cycle is close to the beginning of the half cycle as possible. It is for this reason that the capacitor 27 is used, for capacitor 27 advances the phase angle by 90° of the current flowing therethrough and, hence, advances the voltage signal delivered from the capacitance bridge by 90°.

Referring now to FIGURE 4, a preferred embodiment of an electronic level indicator is shown for an automatic ice making machine. At the outset it should be remembered that the problem in connection with controlling an automatic ice making machine is in some ways quite different from that required for an automatic washing machine. When the automatic ice making machine is started, it continues to make ice until a predetermined quantity of ice has been received in the ice cube storage reservoir. The ice making machine is then turned off and is not started again until the ice cube level in the reservoir reaches a predetermined minimum level. It is, therefore, necessary to have the ice making machine operating over this region from the minimum level to maximum level but to have it shut off in the reverse direction. This requires a more complicated electronic control than is necessary for the automatic ice making machine.

The electronic control circuit for the ice making machine has many of the circuit components shown for the washing machine and where these circuit components are the same, the same reference numerals have been supplied. Specifically, power is obtained from a suitable public utility source such as a 115 volt A.C. power supply line 20, 21. A transistor oscillator 11 is provided including a transistor 22 having a tank circuit composed of capacitor 29 and inductor 30 having feedback provided by the coil 31 which is inductively coupled to the coil 30 of the tank circuit. The output of the oscillator is supplied through a coil 36 which is inductively coupled to the coil 30. A capacitance bridge is provided which includes a capacitor 37 serially connected to a group of parallel arranged capacity devices across coil 36. These parallel arranged capacity devices include a variable capacitor 38 and the capacity provided by the probe 17 in the ice reservoir 16. In the ice maker controlled circuit there is an additional capacity device generally indicated as 53. Specifically, the device 53 includes two capacitors 54 and 55 serially connected on opposite sides of a diode 56. The three series connected elements 54, 55 and 56 are in parallel with capacitors 38 and 39 and the capacity provided by the probe 17. The device 53 also includes a resistor 47 connected across capacitor 55 and diode 56 and a resistor 58 which is connected between the anode of the silicon controlled rectifier 46 and a point 59 between diode 56 and capacitor 55.

Connected to the capacitance bridge are diodes 40 and 41 which are connected in the same way as previously described in describing FIGURE 3. Resistors 44 and 45 are shunted across diodes 40 and 41 as previously described. A bias capacitor 39 is also provided in the manner described in connection with FIGURE 3.

Power supply conductor 20 is connected through switch 28 to the lower end of a solenoid 60 which is arranged when energized to cause operation of the ice making machine. The other side of coil 60 is directly connected to the anode 48 of the silicon controlled rectifier 46.

The problem in controlling the ice making machine is, of course, that the solenoid 60 must continue to be energized during the period that ice cubes are being made, but after the ice making machine has been shut off, solenoid 60 must not be re-energized until some predetermined minimum level of ice cubes in the reservoir 16 has been reached. This means that at the outset a positive voltage must be developed on the upper side of capacitor 39 sufficient to cause the gate 47 to fire the silicon controlled rectifier 46. After the silicon controlled rectifier has been shut off, however, the overall capacitance of the group of parallel capacity devices must be increased in order to decrease the voltage developed on the upper side of capacitor 39 so that the lowering of the capacity represented by the probe 17 of itself will not raise the voltage on the gate 47 sufficient to fire a silicon controlled rectifier. This condition should continue until the capacity represented by the probe 17 has dropped sufficiently to correspond to the minimum ice level desired. This function can be conveniently accomplished by using a diode device 56 as a variable capacity device depending on the back bias or lack of back bias thereacross. Diode 56 is connected into the circuit in such a way that an approximately 20 volt back bias is provided thereacross when the silicon controlled rectifier 46 is conducting and which has very little bias thereacross when the silicon controlled rectifier 46 is not conducting. It will, of course, be appreciated that the effective capacity of diode 56 is minimum when the silicon controlled rectifier is conducting and maximum when the silicon controlled rectifier is not conducting.

When silicon controlled rectifier 46 is not conducting, there is an AC voltage only supplied to the resistor 58. The current path for the 60 cycle current flows through one side of switch 28 from power supply conductor 20, through solenoid 60, resistor 58, capacitor 55, back through switch 28 to the other power supply conductor 21. This results in essentially zero bias across diode 56 and, hence, under these conditions the junction capacitance is high which, in turn, effectively adds capacitance in shunt with probe 17 through capacitor 54. When the silicon controlled rectifier 46 is conducting, there is a half wave rectified voltage applied to resistor 58 thereby charging capacitor 55 with a negative voltage (such as approximately 20 volts). The reason for this is that during conducting half cycles through the silicon controlled rectifier 46, the silicon controlled rectifier 46 acts substantially as a short circuit path around resistor 58 and capacitor 55. The negative voltage on the capacitor 55 provides a reverse voltage across diode 56 which results in decreased junction capacitance. This then reduces the capacitance added to probe 17.

The maximum height of the ice cubes to be delivered to the reservoir is selectable by the user by varying the capacitor 38.

It is sometimes desirable to provide an indicating lamp and to cause such lamp to be lit when the silicon control rectifier is not conducting. This can conveniently be provided by a lamp circuit comprising a lamp 61, a silicon controlled rectifier 62, a capacitor 63 and a resistor 64. The silicon controlled rectifier 62 includes an anode 65, a cathode 66 and a gate 67. When the silicon controlled rectifier 46 is not conducting, a bias is developed on the gate 67 which is sufficient to cause firing of the silicon controlled rectifier 62. Such firing even though of half cycles only is sufficient to cause the indicating lamp 61 to be lit.

It will be understood that modifications and variations may be effected without departing from the scope of the novel concepts of the present invention.

I claim as my invention:

1. The combination comprising a reservoir having at least a wall portion thereof formed of conductive material, electrical means for controlling the delivery of contents to said reservoir, a conducting probe disposed within said reservoir in spaced relationship with said wall portion and forming therewith a capacity device whose capacity is varied as a function of the variation of the height of said contents within said reservoir, a manually adjustable variable capacitor connected in parallel with said capacity device, means including a silicon controlled rectifier and a source of alternating voltage applied across the anode and cathode of said silicon controlled rectifier for energizing said electrical means to initiate delivery of contents to said reservoir, means for developing an alternating control voltage from said source of alternating voltage but of higher frequency, means for advancing the phase of said alternating control voltage by approximately 90° with respect to the voltage applied across the anode-cathode of said silicon controlled rectifier, means for applying said control voltage to the gate of said silicon controlled rectifier for causing current to flow through its anode-cathode circuit, and means responsive to the reaching of a predetermined maximum value of total capacity of said capacity device and said variable capacitor for reducing said control bias voltage applied to said gate to a level below the firing point of said silicon controlled rectifier thereby to deenergize said electrical means.

2. A contents level control for a reservoir, a solenoid for controlling the feed of contents to said reservoir, a silicon controlled rectifier having an anode, a cathode and a gate, alternating current power supply conductors, said solenoid being connected to said conductors through the anode-cathode circuit of said silicon controlled rectifier, a voltage dividing capacitance bridge including first and second leg portions serially connected at a junction, said first leg portion having a plurality of capacity devices connected in parallel between a first end of said bridge and said junction, said second leg portion having at least one capacity device connected between said junction and a second end of said bridge one of said capacity devices in said first leg including means disposed within said reservoir and arranged to have its capacity vary as a function of the height of the contents therein, another of said capacity devices in said first leg being manually variable, a pair of diodes one of which connects said first end of said bridge to said gate and the other of said bridge to said cathode, both diodes being arranged in a forward direction from said bridge to said gate and said cathode, respectively, a bias capacitor connected between said gate and said cathode, the bias on said gate being determined by the voltage drop across said first leg portion of said bridge, an oscillator having an output frequency relatively high as compared to the frequency of the current in said power supply conductors, the output of said oscillator having means for applying the output voltage wave thereof across said bridge, the voltage division between said first and second leg portions of said bias capacitor higher than that necessary to cause firing of said silicon controlled rectifier when the contents in said reservoir are below a desired predetermined maximum level and passes below the critical firing voltage when the contents reach the desired level.

3. A contents level control for a reservoir, a solenoid for controlling the feed of contents to said reservoir, a silicon controlled rectifier having an anode, a cathode and a gate, alternating current power supply conductors, said solenoid being connected to said conductors through the anode-cathode circuit of said silicon controlled rectifier, a voltage dividing capacitance bridge including first and second leg portions serially connected at a junction, said first leg portion having a plurality of capacity devices connected in parallel between a first end of said bridge and said junction, said second leg portion having at least one capacity device connected between said junction and a second end of said bridge one of said capacity devices in said first leg including means disposed within said reservoir and arranged to have its capacity vary as a function of the height of the contents therein, another of said capacity devices in said first leg being manually variable, a pair of diodes one of which connects said first end of said bridge to said gate and the other of which connects the second end of said bridge to said cathode, both diodes being arranged in a forward direction from said bridge to said gate and said cathode, respectively, a bias capacitor connected between said gate and said cathode, the bias on said gate being determined by the voltage drop across said first leg portion of said bridge, an oscillator having an output frequency relatively high as compared to the frequency of the current in said power supply conductors, means for advancing the phase of the output of said oscillator by approximately 90° with respect to the phase of the voltage applied across the anode-cathode circuit of said silicon controlled rectifier, the output of said oscillator having means for applying the output voltage wave thereof across said bridge, the voltage division between said first and second leg portions of said bridge being such that a bias voltage is developed on said bias capacitor higher than that necessary to cause firing of said silicon controlled rectifier when the contents in said reservoir are below a desired predetermined maximum level and passes below the critical firing voltage when the contents reach the desired level.

4. A contents level control for a reservoir, a solenoid for controlling the feed of contents to said reservoir, a silicon controlled rectifier having an anode, a cathode and a gate, alternating current power supply conductors, said solenoid being connected to said conductors through the anode-cathode circuit of said silicon controlled rectifier, a voltage dividing capacitance bridge including first and second leg portions serially connected at a junction, said first leg portion having a plurality of capacity devices connected in parallel between a first end of said bridge and said junction, said second leg portion having at least one capacity device connected between said junction and a second end of said bridge one of said capacity devices in said first leg including means disposed within said reservoir and arranged to have its capacity vary as a function of the height of the contents therein, a second one of said capacity devices in said first leg being manually variable, a third one of said capacity devices including a first capacitor, a diode and a second capacitor, said first capacitor being connected to said junction and to the forward end of said diode, said second capacitor being connected to the first end of said bridge and to the backward end of said diode, a resistor connected between the anode of said silicon controlled rectifier and said forward end of said diode, a resistor connected between said junction and the backward end of said diode thereby providing a voltage depending capacity leg portion, a second pair of diodes one of which connects said first end of said bridge to said gate and the other of which connects the second end of said bridge to said cathode, both of said second diodes being arranged in a forward direction from said bridge to said gate and said cathode, respectively, a bias capacitor connected between said gate and said cathode, the bias on said gate being determined by the voltage drop across said first leg portion of said bridge, an oscillator having an output frequency relatively high as compared to the frequency of the current in said power supply conductors, the output of said oscillator having means for applying the output voltage wave thereof across said bridge, the voltage division between said first and second leg portions of said bridge being such that a bias voltage is developed on said bias capacitor higher than that necessary to cause firing of said silicon controlled rectifier when the contents in said reservoir are below a desired predetermined maximum level and passes below the critical firing voltage when the contents reach the desired level.

5. A contents level control for a reservoir, a solenoid for controlling the feed of contents to said reservoir, a silicon controlled rectifier having an anode, a cathode and a gate, alternating current power supply conductors, said solenoid being connected to said conductors through the anode-cathode circuit of said silicon controlled rectifier, a voltage dividing capacitance bridge including first and second leg portions serially connected at a junction, said first leg portion having a plurality of capacity devices connected in parallel between a first end of said bridge and said junction, said second leg portion having at least one capacity device connected between said junction and a second end of said bridge one of said capacity devices in said first leg including means disposed within said reservoir and arranged to have its capacity vary as a function of the height of the contents therein, another of said capacity devices in said first leg being manually variable, a pair of diodes one of which connects said first end of said bridge to said gate and the other of which connects the second end of said bridge to said cathode, both diodes being arranged in a forward direction from said bridge to said gate and said cathode, respectively, a pair of surge limiting resistors respectively connected in shunt with each of said diodes, a bias capacitor connected between said gate and said cathode, the bias on said gate being determined by the voltage drop across said first leg portion of said bridge, an oscillator having an output frequency relatively high as compared to the frequency of the current in said power supply conductors, the output of said oscillator having means for applying the output voltage wave thereof across said bridge, the voltage division between said first and second leg portions of said bridge being such that a bias voltage is developed on said bias capacitor higher than that necessary to cause firing of said silicon controlled rectifier when the contents in said reservoir are below a desired predetermined maximum level and passes below the critical firing voltage when the contents reach the desired level.

6. A contents level control for a reservoir, a solenoid for controlling the feed of contents to said reservoir, a silicon controlled rectifier having an anode, a cathode and a gate, alternating current power supply conductors, said solenoid being connected to said conductors through the anode-cathode circuit of said silicon controlled rectifier, a voltage dividing capacitance bridge including first and second leg portions serially connected at a junction, said first leg portion having a plurality of capacity devices connected in parallel between a first end of said bridge and said junction, said second leg portion having at least one capacity device connected between said junction and a second end of said bridge one of said capacity devices in said first leg including means disposed within said reservoir and arranged to have its capacity vary as a function of the height of the contents therein, another of said capacity devices in said first leg being manually variable, a pair of diodes one of which connects said first end of said bridge to said gate and the other of which connects the second end of said bridge to said cathode, both diodes being arranged in a forward direction from said bridge to said gate and said cathode, respectively, a bias capacitor connected between said gate and said cathode, the bias on said gate being determined by the voltage drop across said first leg portion of said bridge, an oscillator having an output frequency relatively high as compared to the frequency of the current in said power supply conductors, the output of said oscillator having means for applying the output voltage wave thereof across said bridge, the voltage division between said first and second leg portions of said bridge being such that a bias voltage is developed on said bias capacitor higher than that necessary to cause firing of said silicon controlled rectifier when the contents in said reservoir are below a desired predetermined maximum level and passes below the critical firing voltage when the contents reach the desired level, a signal indicating lamp, a second silicon controlled rectifier, means connecting said second silicon controlled rectifier to said conductors through the anode-cathode circuit of said second silicon controlled rectifier, a capacitor connected between the gate and the cathode of said second silicon controlled rectifier and a resistor connecting said gate of said second silicon controlled rectifier to the anode of said first silicon controlled rectifier, and a diode connected across said solenoid.

7. In an appliance having a tub, a valve means for controlling the flow of goods thereinto, and a timing means for actuating appliance operations, an electronic level control circuit comprising at least one conductor disposed within said tub for generating a capacitance dependent upon the level of goods therein, means for sensing the capacitance associated with said one conductor, means for activating said timing means, means for activating said valve means and substantially simultaneously deactivating said timing means in response to said capacitance sensing means, said activating and deactivating means comprising an electronic switch connected as a shunt to said timing means, said electronic switch and timing means in combination being series connected with said valve means, said electronic switch being actuated by said capacitance sensing means, whereby actuation of said electronic switch provides a short circuit for deactivating said timing means and releasing thereby a substantially larger voltage for activating said series connected valve means.

8. In a reservoir having at least a portion thereof formed of a conductive material, electrical means for controlling the delivery of contents to said reservoir, a conducting probe disposed within said reservoir in spaced relationship with said portion of said reservoir and forming therewith a capacity device whose capacity is varied as a function of the level of said contents within said reservoir, a control circuit comprising:
an oscillator circuit,
means for coupling said oscillator circuit to a standard AC supply source,
said oscillator circuit being tuned to a frequency substantially higher than that of said standard supply source,
a capacitance control circuit including said conductive probe and a parallel coupled capacitor, said capacitance control circuit also including a rectifier and a capacitance means for developing a DC voltage in proportion to the AC voltage developed across said probe capacity device, a high impedance coupling between the output of said oscillator circuit and the input of said capacitance control circuit,
an electronic trigger circuit for controlling the energization of said electrical means, and
means responsive to the output of said capacitance control circuit for actuating said electronic trigger circuit.

9. A control circuit in accordance with claim 8 wherein said parallel coupled capacitor includes a variable capacitor.

10. A control circuit in accordance with claim 8 wherein said trigger circuit includes an SCR and wherein the output of said capacitance means is coupled directly to the gate of said SCR for actuating the same.

References Cited

UNITED STATES PATENTS

| | | |
|---|---|---|
| 2,477,511 | 7/1949 | Comb. |
| 2,529,796 | 11/1950 | Cade. |
| 2,871,874 | 2/1959 | Coles et al. _____ 137—392 |
| 2,962,641 | 11/1960 | Maltby et al. |
| 3,109,893 | 11/1963 | Burns. |
| 3,206,615 | 9/1965 | LaPointe. |
| 3,246,210 | 4/1966 | Lurenz _____ 62—137 XR |
| 3,252,420 | 5/1966 | Sorensen. |
| 3,285,275 | 11/1966 | Couffer et al. _____ 137—342 |
| 3,291,149 | 12/1966 | Atkins et al. _____ 137—392 |

WILLIAM F. O'DEA, *Primary Examiner.*

D. R. MATTHEWS, *Assistant Examiner.*